United States Patent
Yoneda et al.

(10) Patent No.: US 10,358,128 B2
(45) Date of Patent: Jul. 23, 2019

(54) CONTROL DEVICE FOR VEHICLE

(71) Applicant: SUBARU CORPORATION, Tokyo (JP)

(72) Inventors: Takeshi Yoneda, Tokyo (JP); Hiroshi Ienaga, Tokyo (JP); Takahiro Kobayashi, Tokyo (JP); Shinichi Sakaguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/879,205

(22) Filed: Jan. 24, 2018

(65) Prior Publication Data
US 2018/0265081 A1    Sep. 20, 2018

(30) Foreign Application Priority Data

Mar. 16, 2017    (JP) ................. 2017-051623

(51) Int. Cl.
*B60T 7/18* (2006.01)
*B60W 30/09* (2012.01)
(Continued)

(52) U.S. Cl.
CPC ............... *B60W 30/09* (2013.01); *B60T 7/12* (2013.01); *B60T 7/22* (2013.01); *B60T 8/17* (2013.01);
(Continued)

(58) Field of Classification Search
CPC ............. B60W 30/09; B60W 30/0956; B60W 40/068; B60W 2550/148; B60T 7/12
(Continued)

(56) References Cited

U.S. PATENT DOCUMENTS 5,332,057 A * 7/1994 Butsuen ............. B60K 31/0008
                                                180/169
5,895,098 A * 4/1999 Stacey ................... B60T 7/042
                                                303/115.2
(Continued)

FOREIGN PATENT DOCUMENTS

CN    102653272 A    9/2012
CN    102971193 A    3/2013
(Continued)

OTHER PUBLICATIONS

JPO Decision of Grant dated Jul. 10, 2018, in JPA No. 2017-051623.
(Continued)

*Primary Examiner* — Thomas G Black
*Assistant Examiner* — Wae L Louie
(74) *Attorney, Agent, or Firm* — McGinn I. P. Law Group, PLLC.

(57) ABSTRACT

A control device for a vehicle includes a predictor and a controller. The predictor is configured to predict, on the basis of change information, whether or not the vehicle will collide with a frontward obstacle, on the condition that a brake operation by a driver has been performed. The change information is information regarding a change in a friction coefficient of a road surface frontward of the vehicle. The controller is configured to control brake power of the vehicle on the basis of the change information, on the condition that a prediction is made that the vehicle will collide with the obstacle.

20 Claims, 8 Drawing Sheets

(51) Int. Cl.
*B60W 30/095* (2012.01)
*B60W 40/068* (2012.01)
*B60T 7/12* (2006.01)
*B60T 7/22* (2006.01)
*B60T 8/17* (2006.01)

(52) U.S. Cl.
CPC ...... *B60W 30/0956* (2013.01); *B60W 40/068* (2013.01); *B60T 2201/022* (2013.01); *B60T 2210/12* (2013.01); *B60W 2550/148* (2013.01)

(58) Field of Classification Search
USPC .......................................................... 701/70
See application file for complete search history.

(56) References Cited

U.S. PATENT DOCUMENTS

| | | | | |
|---|---|---|---|---|
| 6,056,374 A | * | 5/2000 | Hiwatashi | B60K 31/0008 180/169 |
| 2005/0143889 A1 | * | 6/2005 | Isaji | G08G 1/161 701/70 |
| 2011/0295464 A1 | * | 12/2011 | Zagorski | B60T 7/18 701/41 |
| 2012/0226423 A1 | * | 9/2012 | Sekiguchi | B60T 7/22 701/70 |
| 2013/0103274 A1 | * | 4/2013 | Binder | B60W 40/06 701/65 |
| 2014/0267628 A1 | * | 9/2014 | Randler | B60W 40/068 348/47 |
| 2017/0210380 A1 | * | 7/2017 | Hegemann | B60W 30/09 |
| 2017/0225614 A1 | * | 8/2017 | Park | B60R 21/00 |
| 2017/0255824 A1 | * | 9/2017 | Miller | G06K 9/00624 |
| 2017/0267220 A1 | * | 9/2017 | Serra | B60T 8/17636 |
| 2017/0313332 A1 | * | 11/2017 | Paget | B61L 27/0077 |
| 2017/0320474 A1 | * | 11/2017 | Svensson | B60T 7/042 |
| 2018/0154850 A1 | * | 6/2018 | Yates | G08G 1/166 |
| 2018/0265081 A1 | * | 9/2018 | Yoneda | B60T 7/22 |

FOREIGN PATENT DOCUMENTS

| | | |
|---|---|---|
| JP | H 05-58319 A | 3/1993 |
| JP | H 11-255089 A | 9/1999 |
| JP | 2002-225691 A | 8/2002 |
| JP | 2015-209047 A | 11/2015 |

OTHER PUBLICATIONS

Chinese Office Action dated Mar. 18, 2019, in corresponding Chinese Patent Application No. 201810127425.7, with an English translation thereof.

* cited by examiner

CONTROL DEVICE FOR VEHICLE

CROSS-REFERENCE TO RELATED APPLICATIONS

The present application claims priority from Japanese Patent Application No. 2017-051623 filed on Mar. 16, 2017, the entire contents of which are hereby incorporated by reference.

BACKGROUND

The technology relates to a control device for a vehicle.

A brake power control has been utilized for purposes of enhancing safety. The brake power control is a technique of controlling brake power of a vehicle. Regarding such a brake power control, specifically, in order to prevent the vehicle from colliding with a frontward obstacle, proposals have been made for various techniques related to a control that causes the vehicle to stop in front of the obstacle. For example, reference is made to Japanese Unexamined Patent Application Publication (JP-A) No. Hei 11-255089.

SUMMARY

In a case where a brake operation by a driver has been performed, it is desired to enhance safety with the utilization of the brake power control, i.e., the technique of controlling the brake power of the vehicle.

It is desirable to provide a control device for a vehicle that makes it possible to enhance safety with the utilization of a brake power control.

An aspect of the technology provides a control device for a vehicle. The control device includes a predictor and a controller. The predictor is configured to predict, on the basis of change information, whether or not the vehicle will collide with a frontward obstacle, on the condition that a brake operation by a driver has been performed. The change information is information regarding a change in a friction coefficient of a road surface frontward of the vehicle. The controller is configured to control brake power of the vehicle on the basis of the change information, on the condition that a prediction is made that the vehicle will collide with the obstacle.

An aspect of the technology provides a control device for a vehicle. The control device includes circuitry. The circuitry is configured to predict, on the basis of change information, whether or not the vehicle will collide with a frontward obstacle, on the condition that a brake operation by a driver has been performed. The change information is information regarding a change in a friction coefficient of a road surface frontward of the vehicle. The circuitry is configured to control brake power of the vehicle on the basis of the change information, on the condition that a prediction is made that the vehicle will collide with the obstacle.

DETAILED DESCRIPTION

Figure 1:
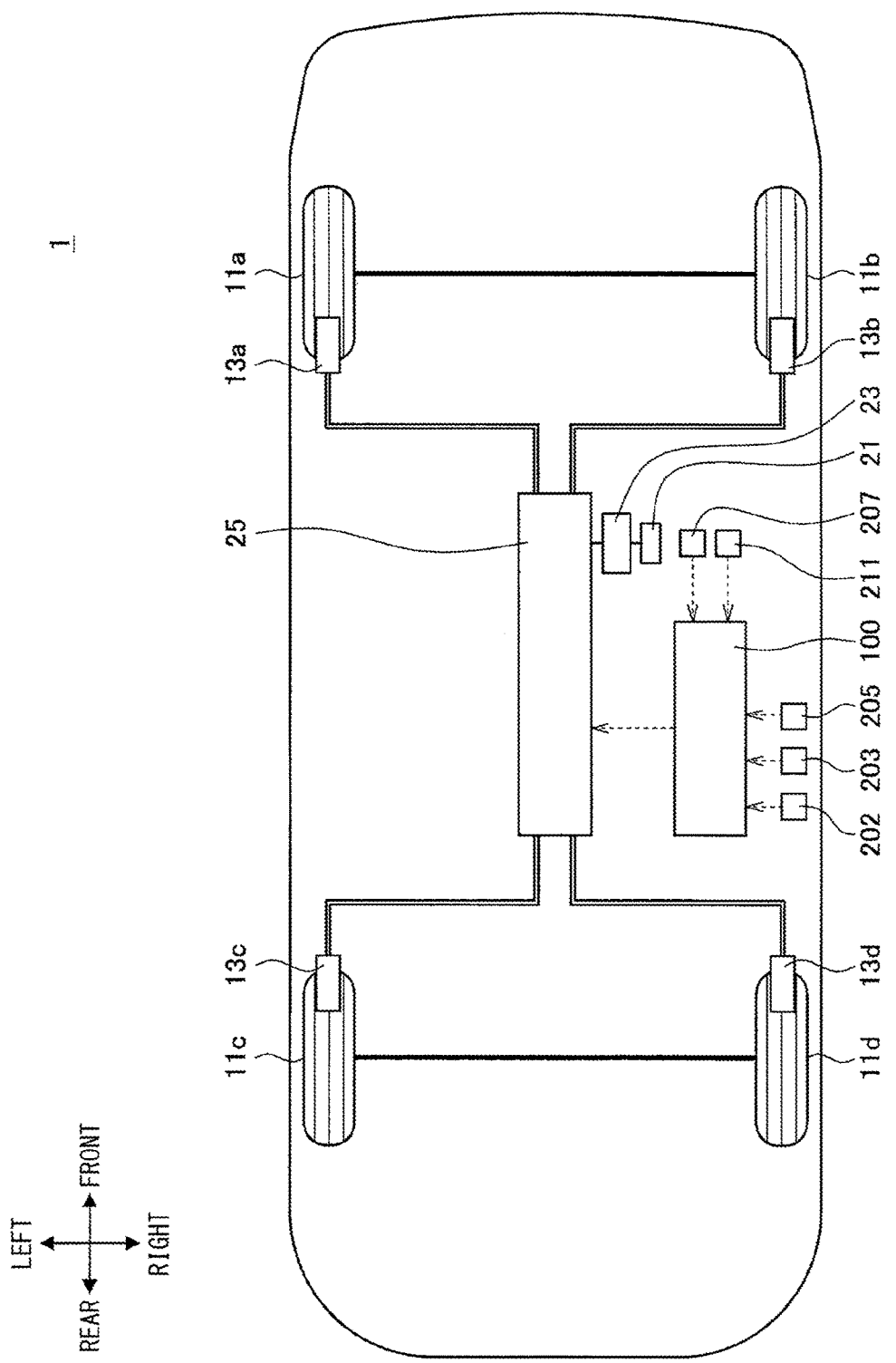
FIG. 1 schematically illustrates in outline one example of a configuration of a vehicle according to one implementation of the technology.

In the following, some implementations of the technology are described in detail with reference to the drawings. It is to be noted that in the description of the implementations, constituent elements having substantially the same functions and configurations are denoted by the same reference characters, with description thereof omitted to avoid redundancy.

1. Vehicle in Outline

Figure 2:
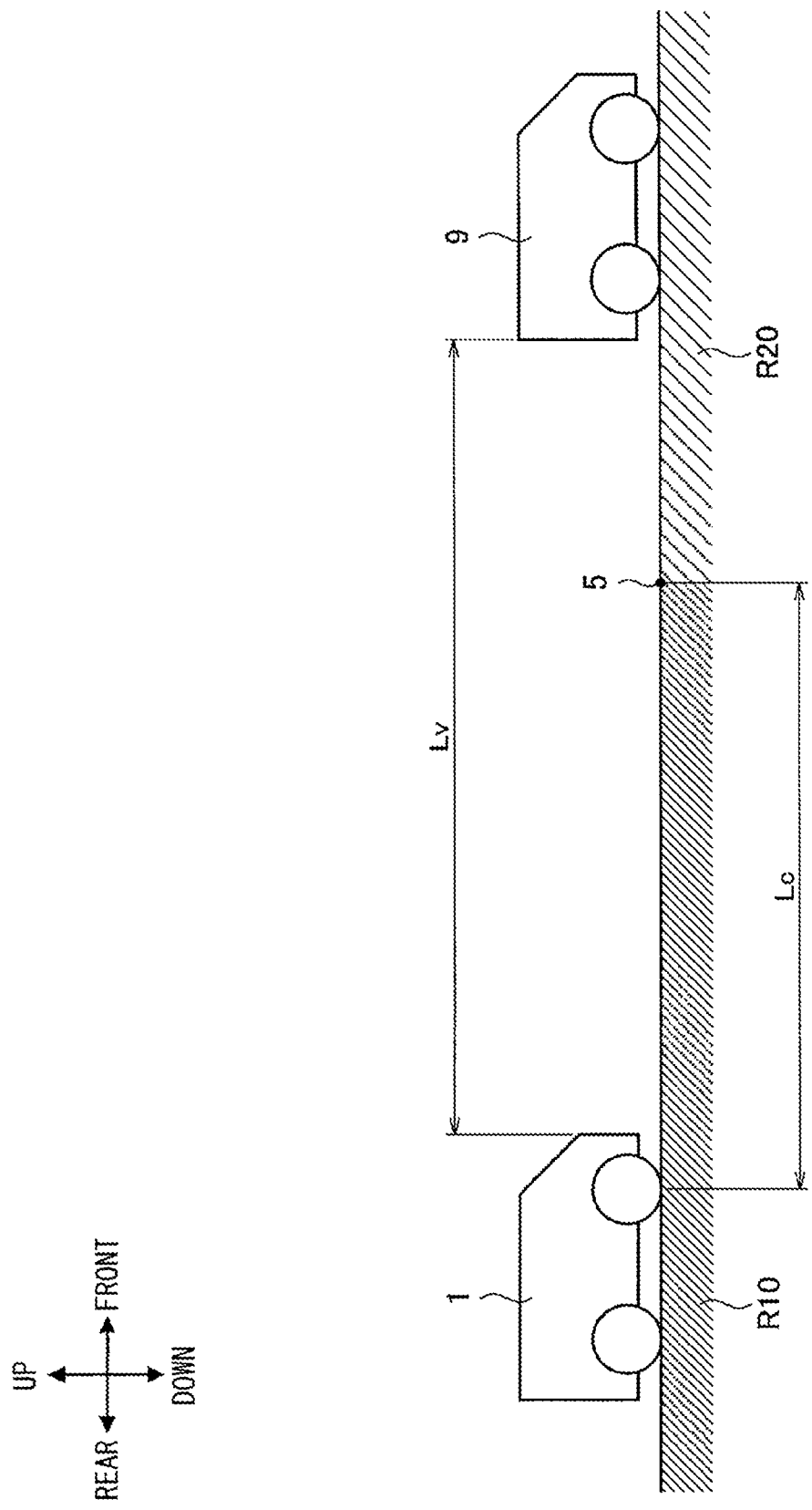
FIG. 2 illustrates a point of decrease in a friction coefficient of a road surface frontward of the vehicle, and a stopped vehicle.

First, with reference to FIGS. 1 and 2, described in outline is a vehicle 1 according to one implementation of the technology. FIG. 1 schematically illustrates in outline one example of a configuration of the vehicle 1 according to the implementation.

The vehicle 1 is one example of a vehicle including a control device according to this implementation. The vehicle 1 may include, for example, as illustrated in FIG. 1, a brake pedal 21, a master cylinder 23, a hydraulic pressure supply unit 25, brake devices 13a, 13b, 13c, and 13d, and a control device 100. The brake devices 13a, 13b, 13c, and 13d may be respectively provided on wheels 11a, 11b, 11c, and 11d. The wheels 11a, 11b, 11c, and 11d correspond respectively to a left front wheel, a right front wheel, a left rear wheel, and a right rear wheel. It is to be noted that the following description is given, with a direction of an advance of the vehicle 1 being referred to as a front direction, with an opposite direction to the direction of the advance being referred to as a rear direction, with left side and right side as turned to the direction of the advance being referred to as a left direction and a right direction, and with vertically upper side and vertically lower side being referred to as an up direction and a down direction.

The brake pedal 21 may receive a brake operation by a driver. Specifically, the brake operation may be an operation of stepping down the brake pedal 21. The brake pedal 21 may be coupled to the master cylinder 23 through an undepicted booster device. The master cylinder 23 may generate hydraulic pressure in accordance with an operation force of the brake pedal 21, i.e., a force of stepping down the brake pedal 21. The master cylinder 23 may be coupled to the brake devices 13a, 13b, 13c, and 13d through the hydraulic pressure supply unit 25. The brake devices 13a, 13b, 13c, and 13d may be respectively provided on the wheels 11a, 11b, 11c, and 11d. Moreover, the hydraulic pressure generated by the master cylinder 23 may be supplied to the brake devices 13a, 13b, 13c, and 13d through the hydraulic pressure supply unit 25. This causes the brake devices 13a, 13b, 13c, and 13d to operate, allowing the wheels 11a, 11b, 11c, and 11d to be braked.

The brake devices 13a, 13b, 13c, and 13d may each include, for example, a brake caliper. The brake caliper may include brake pads and a wheel cylinder. The bake pads may be provided in a pair in confronted relation on both sides of a brake disk that rotates in unity with a corresponding one of the wheels 11a, 11b, 11c, and 11d. The wheel cylinder may be formed inside the brake caliper. Inside the wheel cylinder, a piston may be slidably provided. A tip of the piston may be provided in confronted relation with one of the brake pads. A slide of the piston may cause the brake pads to move toward both sides of the brake disk. The hydraulic pressure generated by the master cylinder 23 may be supplied to the wheel cylinder of each of the brake devices 13a, 13b, 13c, and 13d. This causes the piston and the brake pads inside the brake caliper to move, causing both sides of the brake disk to be held by the pair of the brake pads, to allow the wheels 11a, 11b, 11c, and 11d to be braked.

The hydraulic pressure supply unit 25 may include, for example, a pump and a control valve, and be able to adjust the hydraulic pressure to be supplied to the brake devices 13a, 13b, 13c, and 13d. For example, the hydraulic pressure supply unit 25 may be able to separately adjust the hydraulic pressure to be supplied to the brake devices 13a, 13b, 13c, and 13d. Operation of the hydraulic pressure supply unit 25 may be controlled by the control device 100. Thus, the brake power to be imparted to the wheels 11a, 11b, 11c, and 11d may be controlled.

The vehicle 1 may include various sensors. For example, as illustrated in FIG. 1, the vehicle 1 may include a speed sensor 202, a deceleration sensor 203, a road-surface μ sensor 205, and a pedal sensor 207.

The speed sensor 202 may detect a speed of the vehicle 1, and output a detection result.

The deceleration sensor 203 may detect deceleration of the vehicle 1, and output a detection result.

The road-surface μ sensor 205 may detect distribution of a friction coefficient of a road surface frontward of the vehicle 1, and output a detection result. In one specific but non-limiting example, the road-surface μ sensor 205 may detect spatial distribution of the friction coefficient of the road surface frontward of the vehicle 1 along the direction of the advance. The road-surface μ sensor 205 may be, for example, a device that sends out a millimeter wave on the frontward road surface, captures its reflected wave to measure an amount of moisture of the road surface, and detects the distribution of the friction coefficient of the road surface frontward of the vehicle 1 on the basis of a measurement result of the amount of the moisture. Alternatively, the road-surface μ sensor 205 may be a device that captures an image of the frontward road surface, and performs image processing on the image obtained, to detect the distribution of the friction coefficient of the road surface frontward of the vehicle 1.

The pedal sensor 207 may detect the operation force of the brake pedal 21 by the driver, and output a detection result.

Moreover, the vehicle 1 may include a frontward recognition device 211. The frontward recognition device 211 may be able to recognize an obstacle frontward of the vehicle 1. Furthermore, upon recognizing the obstacle frontward of the vehicle 1, the frontward recognition device 211 may measure a distance from the vehicle 1 to the obstacle, and output a measurement result. In one specific but non-limiting example, the frontward recognition device 211 may include a pair of cameras on right and left sides. The pair of cameras may each include an imaging element such as a charge coupled device (CCD) sensor or a complementary metal oxide semiconductor (CMOS) sensor. The frontward recognition device 211 may be able to recognize the obstacle frontward of the vehicle 1, by capturing an image of exterior environment frontward of the vehicle 1, and performing image processing on the image obtained. Moreover, the frontward recognition device 211 may be able to measure the distance from the vehicle 1 to the obstacle frontward of the vehicle 1 by a principle of triangulation from an amount of deviation of corresponding positions in a set of left and right stereo images captured.

The control device 100 may include, for example, a central processing unit (CPU), a read only memory (ROM), and a random access memory (RAM). The CPU may be a computation processing device. The ROM may be a storage element that stores, for example, programs to be used by the CPU and computation parameters. The RAM may be a storage element that temporarily stores, for example, parameters that change as appropriate in execution by the CPU.

The control device 100 may control operation of each of the devices that constitute the vehicle 1. For example, the control device 100 may output an operational instruction to each of the devices as a target of control, with the use of an electrical signal, to control the operation of each of the devices. In one specific but non-limiting example, the control device 100 may control each device of the hydraulic pressure supply unit 25, e.g., the pump and the control valve, to control the hydraulic pressure to be supplied to the brake devices 13a, 13b, 13c, and 13d. Therefore, the control device 100 may be able to control the brake power to be imparted to the wheels 11a, 11b, 11c, and 11d. Accordingly, the control device 100 may be able to control the brake power of the vehicle 1 that corresponds to a total of the brake power to be imparted to the wheels 11a, 11b, 11c, and 11d. That way, the control device 100 may execute a brake power control.

Moreover, the control device 100 may receive information outputted from each of the devices. Communication of the control device 100 with each of the devices may be performed with the use of, for example, controller area network (CAN) communication. For example, the control device 100 may receive various kinds of the detection results outputted from the speed sensor 202, the deceleration sensor 203, the road-surface μ sensor 205, and the pedal sensor 207. Moreover, the control device 100 may receive the measurement result regarding the distance from the vehicle 1 to the obstacle frontward of the vehicle 1 outputted from the frontward recognition device 211. It is to be noted that the functions of the control device 100 according to this implementation may be distributed to a plurality of control devices. In this case, the plurality of the control devices may be coupled to one another through a communication bus such as the CAN.

Here, the control device 100 may acquire change information, i.e., information regarding a change in the friction coefficient of the road surface frontward of the vehicle 1. For example, the change information may be acquired by extraction from the detection result of the distribution of the friction coefficient of the road surface frontward of the vehicle 1 outputted from the road-surface μ sensor 205. In one specific but non-limiting example, the change information may be information regarding a point of decrease, i.e., a point at which the friction coefficient of the road surface decreases frontward of the vehicle 1.

FIG. 2 illustrates the point of decrease 5 in the friction coefficient of the road surface frontward of the vehicle 1, and a stopped vehicle 9. Specifically, FIG. 2 illustrates a state in which the vehicle 1 is traveling on a high-μ road R10 to which a low-μ road R20 is coupled frontward. The low-μ road R20 may have a road surface having a relatively low friction coefficient, or specifically, a road surface having a friction coefficient smaller than a predetermined threshold. Meanwhile, the high-μ, road R10 may have a road surface having a relatively high friction coefficient, or specifically, a road surface having a friction coefficient equal to or larger than the predetermined threshold. The predetermined threshold may be any value insofar as the value makes it possible to determine whether or not a road surface as a target is the low-μ road such as a frozen road surface. The predetermined threshold may take various values.

As mentioned above, the point of decrease 5 may be the point at which the friction coefficient of the road surface decreases frontward of the vehicle 1. In the example illustrated in FIG. 2, a coupling part of a front end of the high-μ, road R10 to a rear end of the low-μ road R20 may serve as the point of decrease 5. The control device 100 may acquire, for example, information indicating a distance Lc from the vehicle 1 to the point of decrease 5, on the basis of the detection result of the distribution of the friction coefficient of the road surface frontward of the vehicle 1 outputted from the road-surface μ sensor 205. Moreover, the control device 100 may acquire information indicating the friction coefficient of the low-μ road R20 frontward of the point of decrease 5, on the basis of the detection result of the distribution of the friction coefficient of the road surface frontward of the vehicle 1.

Furthermore, in FIG. 2, illustrated is the stopped vehicle 9. The stopped vehicle 9 may be a vehicle that is stopped frontward of the vehicle 1. The stopped vehicle 9 may serve as one example of the obstacle frontward of the vehicle 1. Specifically, the stopped vehicle 9 may be located on the low-μ road R20 frontward of the point of decrease 5. In this case, the control device 100 may acquire a measurement result of a distance Lv from the vehicle 1 to the stopped vehicle 9.

In a case where the brake operation by the driver has been performed, it is plausible to limit execution of the brake power control, in order to bring behavior of the vehicle close to the driver's intended behavior. However, as exemplified in FIG. 2, in a case with presence of the point of decrease 5 in the friction coefficient frontward of the vehicle 1, there may be a case where the driver's intended deceleration is not obtained on the low-μ road R20 frontward of the point of decrease 5. In such a case, an actual braking distance may become longer than the driver's intended braking distance, resulting in possibility that the vehicle 1 will collide with the stopped vehicle 9 frontward. Here, in the control device 100 according to this implementation, in the case where the brake operation by the driver has been performed, the brake power control may be executed on the basis of the change information, i.e., the information related to the change in the friction coefficient of the road surface frontward of the vehicle 1. Hence, it is possible to enhance safety while suppressing the driver from feeling strange. Details of the control device 100 as described above are described later.

It is to be noted that the control device 100 may acquire the detection result of the distribution of the friction coefficient of the road surface frontward of the vehicle 1, from an external device. For example, the control device 100 may acquire the detection result by performing road-vehicle communication with a roadside machine. In this case, the road-surface μ sensor 205 may be omitted from the configuration of the vehicle 1.

Moreover, the control device 100 may acquire the measurement result of the distance from the vehicle 1 to the obstacle frontward of the vehicle 1, from an external device. For example, the control device 100 may acquire the measurement result by performing the road-vehicle communication with the roadside machine. In this case, the frontward recognition device 211 may be omitted from the configuration of the vehicle 1.

2. Control Device

Description now moves on to the details of the control device 100 according to this implementation, with reference to FIGS. 3 to 8.

[2-1. Functional Configuration]

Figure 3:
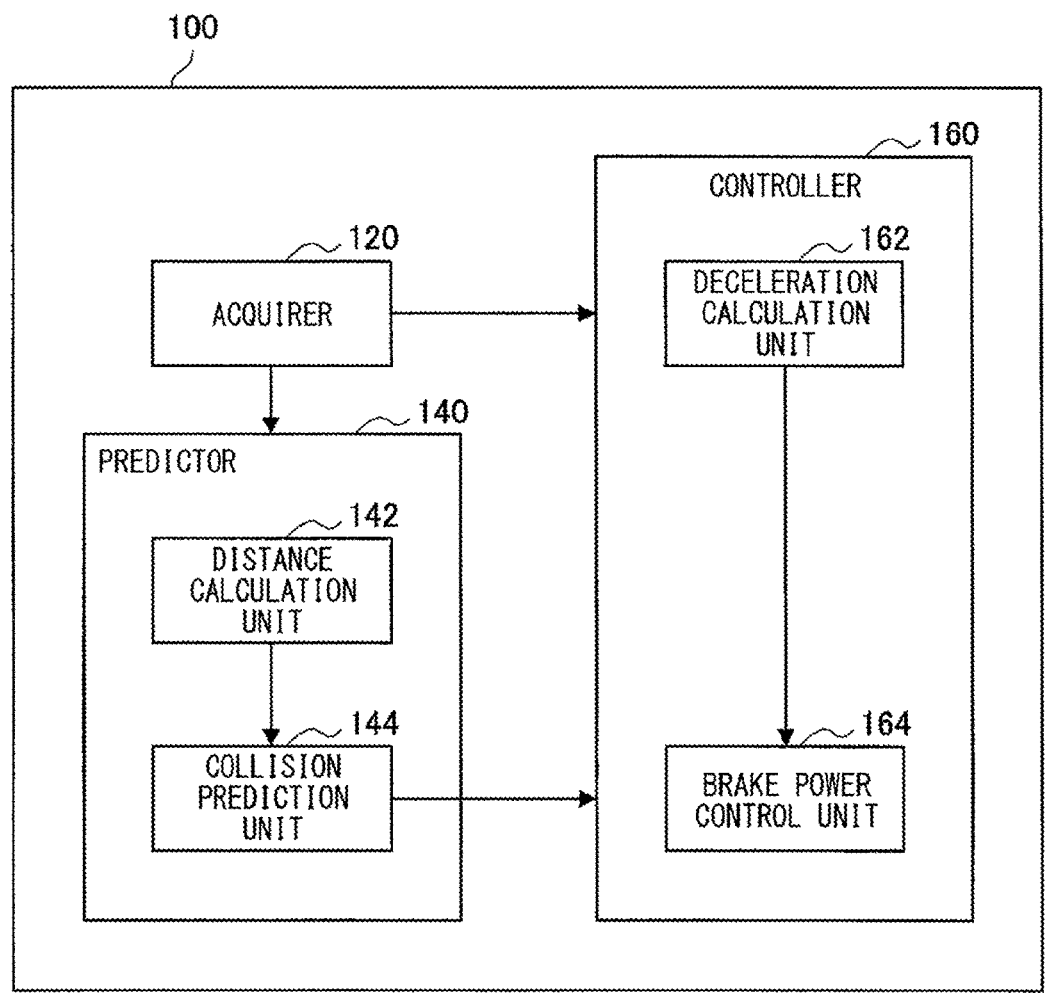
FIG. 3 is a block diagram of one example of a functional configuration of a control device according to the implementation.

First, with reference to FIGS. 3 to 7, described is a functional configuration of the control device 100 according to this implementation. FIG. 3 is a block diagram of one example of the functional configuration of the control device 100 according to this implementation.

The control device 100 may include, for example, as illustrated in FIG. 3, an acquirer 120, a predictor 140, and a controller 160.

[Acquirer]

The acquirer 120 may acquire various kinds of information outputted from external devices. Moreover, the acquirer 120 may output the various kinds of the information acquired, to the predictor 140 and the controller 160. In one specific but non-limiting example, the acquirer 120 may acquire the detection results outputted from the speed sensor 202, the deceleration sensor 203, the road-surface μ sensor 205, and the pedal sensor 207. Moreover, the acquirer 120 may acquire the measurement result outputted from the frontward recognition device 211. In one specific but non-limiting example, the acquirer 120 may acquire a value of the distance Lv from the vehicle 1 to the stopped vehicle 9.

The acquirer 120 may extract the various kinds of the information from the detection results outputted from the sensors, to acquire the various kinds of the information. In one specific but non-limiting example, the acquirer 120 may extract the change information, i.e., the information regarding the change in the friction coefficient of the road surface frontward of the vehicle 1, from the detection result outputted from the road-surface μ sensor 205, to acquire the change information. The change information may include, for example, the information indicating the distance Lc from the vehicle 1 to the point of decrease 5, as mentioned above. Moreover, the change information may include the information indicating the friction coefficient of the low-μ road R20 frontward of the point of decrease 5.

It is to be noted that execution of acquisition processing of the various kinds of the information by the acquirer 120 may be triggered by the brake operation by the driver being performed. For example, the control device 100 may determine whether or not the brake operation by the driver has been performed, on the basis of the detection result outputted from the pedal sensor 207.

[Predictor]

The predictor 140 predicts whether or not the vehicle 1 will collide with the frontward obstacle, in the case where the brake operation by the driver has been performed. Moreover, the predictor 140 may output a prediction result to the controller 160. In one specific but non-limiting example, the predictor 140 predicts whether or not the vehicle 1 will collide with the frontward obstacle, on the basis of the change information, in the case where the brake operation by the driver has been performed. The change information is the information regarding the change in the friction coefficient of the road surface frontward of the vehicle 1.

The predictor 140 may include, for example, as illustrated in FIG. 3, a distance calculation unit 142 and a collision prediction unit 144.

The distance calculation unit 142 may calculate, on the basis of the change information, a predicted braking distance Lp, i.e., a predicted value of the braking distance of the vehicle 1. In one specific but non-limiting example, the predicted braking distance Lp may be the predicted value of the braking distance in a case where the brake power control is not executed. Moreover, the distance calculation unit 142 may output information indicating the predicted braking distance Lp calculated, to the collision prediction unit 144. For example, execution of calculation processing of the predicted braking distance Lp by the distance calculation unit 142 may be triggered by the brake operation by the driver being performed.

Figure 4A:
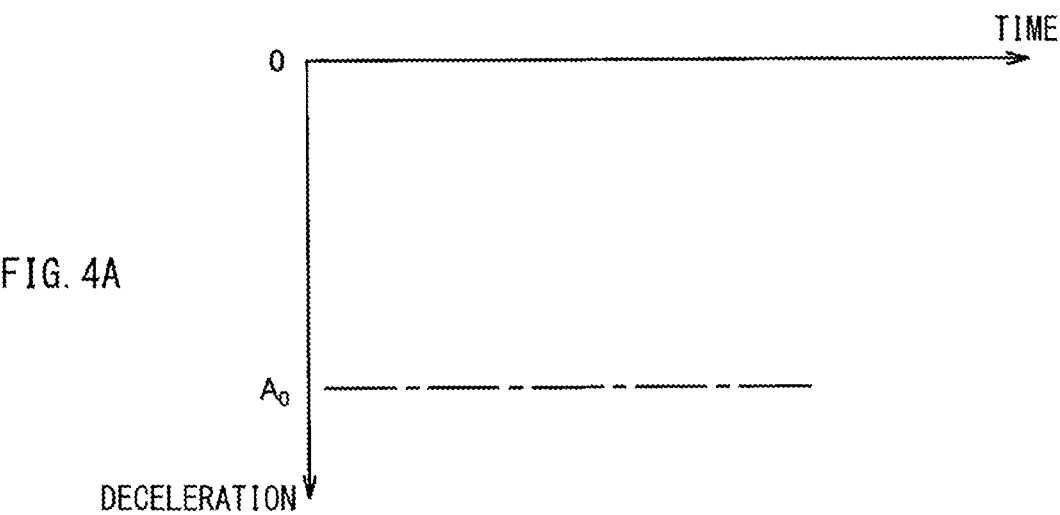
FIG. 4A schematically illustrates one example of a driver's intended transition of deceleration after a brake operation has been performed.
Figure 4B:
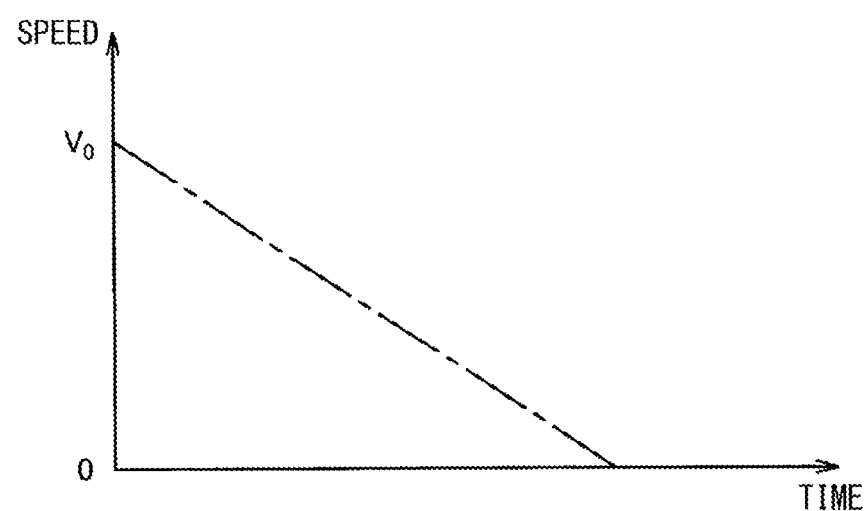
FIG. 4B schematically illustrates one example of the driver's intended transition of a speed after the brake operation has been performed.
Figure 4C:
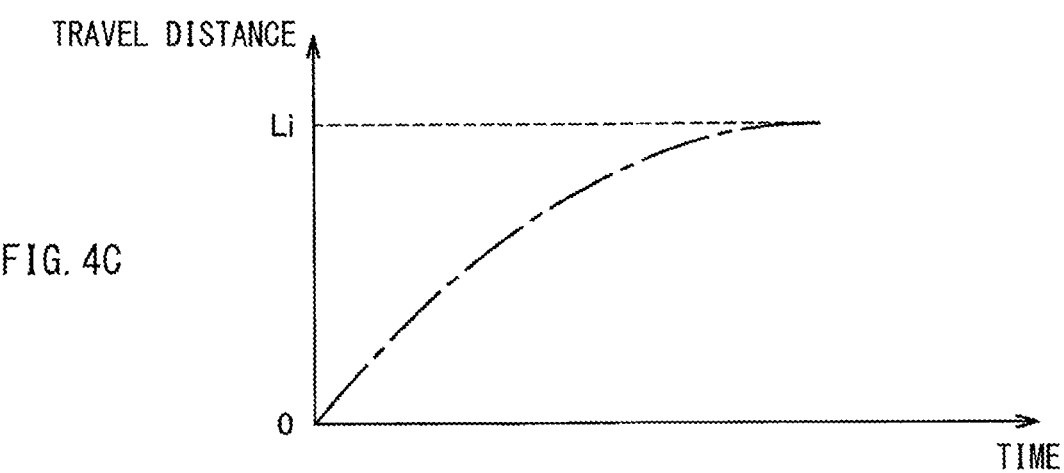
FIG. 4C schematically illustrates one example of the driver's intended transition of a travel distance after the brake operation has been performed.

First, with reference to FIGS. 4A, 4B, and 4C, described is the driver's intended braking distance Li, as intended by the driver who has performed the brake operation. FIGS. 4A, 4B, and 4C schematically illustrate one example of the driver's intended transitions of various state quantities after the brake operation has been performed. Specifically, FIGS. 4A, 4B, and 4C illustrate, as the various state quantities, the deceleration of the vehicle 1, the speed of the vehicle 1, and a travel distance of the vehicle 1. Specifically, the travel distance of the vehicle 1 corresponds to a distance by which the vehicle 1 advances from a current position along the direction of the advance.

For example, as illustrated in FIG. 4A, after the brake operation has been performed, the driver's intended deceleration of the vehicle 1 is maintained at current deceleration $A_0$ of the vehicle 1. Accordingly, as illustrated in FIG. 4B, the driver's intended speed of the vehicle 1 decreases from a current speed $V_0$ of the vehicle 1 at a time change rate corresponding to the deceleration $A_0$. The driver's intended braking distance Li corresponds to the travel distance of the vehicle 1 at time at which the speed of the vehicle 1 becomes zero (0) in the case with such a transition of the speed of the vehicle 1. Therefore, the driver's intended braking distance Li is a distance by which the vehicle 1 advances from the current position until the vehicle 1 is stopped, in the case with the driver's intended transition of the deceleration of the vehicle 1.

Figure 5A:
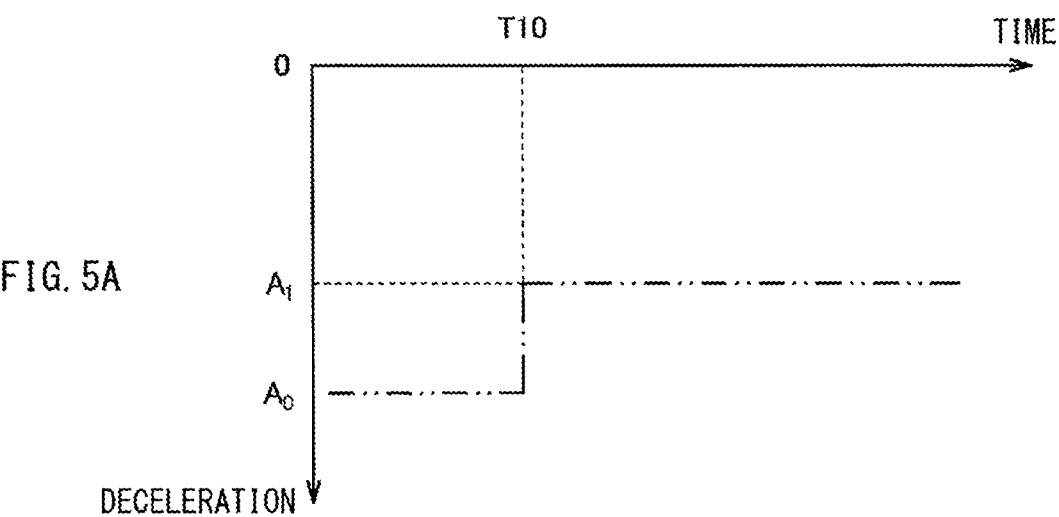
FIG. 5A schematically illustrates one example of transition of a predicted value of the deceleration in calculation processing of a predicted braking distance according to the implementation.
Figure 5B:
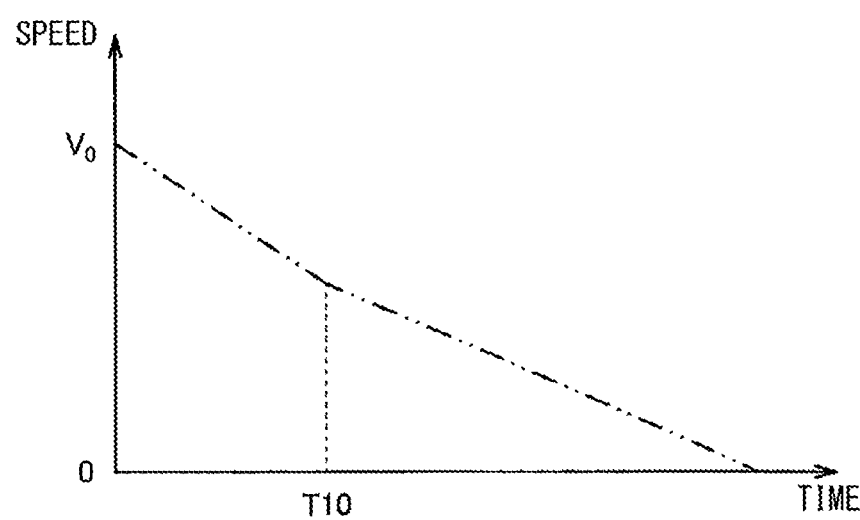
FIG. 5B schematically illustrates one example of transition of a predicted value of the speed in the calculation processing of the predicted braking distance according to the implementation.
Figure 5C:
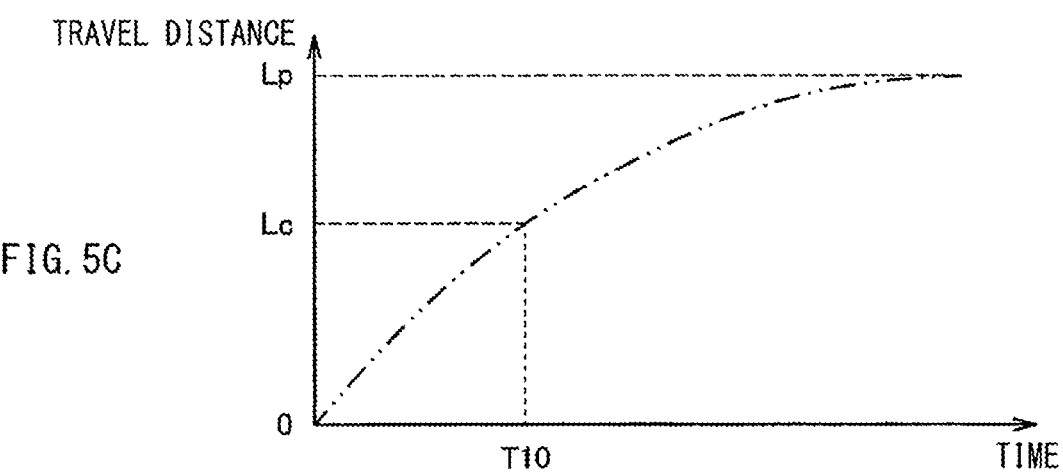
FIG. 5C schematically illustrates one example of transition of a predicted value of the travel distance in the calculation processing of the predicted braking distance according to the implementation.

Next, with reference to FIGS. 5A, 5B, and 5C, described is a predicted braking distance Lp to be calculated by the control device 100. FIGS. 5A, 5B, and 5C schematically illustrate one example of transitions of predicted values of the various state quantities in calculation processing of the predicted braking distance Lp according to this implementation. Specifically, FIGS. 5A, 5B, and 5C illustrate, as the various state quantities, the deceleration of the vehicle 1, the speed of the vehicle 1, and the travel distance of the vehicle 1, as with FIGS. 4A, 4B, and 4C. Moreover, FIGS. 5A, 5B, and 5C illustrate one example of the transitions of the predicted values of the various state quantities after the brake operation has been performed.

In one specific but non-limiting example, the distance calculation unit 142 may calculate the predicted braking distance Lp on the basis of the current speed $V_0$ of the vehicle 1, the current deceleration $A_0$ of the vehicle 1, the distance Lc from the vehicle 1 to the point of decrease 5, and the friction coefficient of the low-μ road R20 frontward of the point of decrease 5.

For example, the distance calculation unit 142 may, first, predict time at which the vehicle 1 arrives at the point of decrease 5. The distance calculation unit 142 may apply the current deceleration $A_0$ of the vehicle 1, as a predicted value of the deceleration of the vehicle 1 rearward of the point of decrease 5. In other words, the distance calculation unit 142 may apply the current deceleration $A_0$ of the vehicle 1, as the predicted value of the deceleration of the vehicle 1 with respect to the high-μ, road R10. For example, the distance calculation unit 142 may make a prediction that after the brake operation has been performed, as illustrated in FIG. 5B, the speed of the vehicle 1 will decrease from the current speed $V_0$ of the vehicle 1 at the time change rate corresponding to the deceleration $A_0$. Accordingly, the distance calculation unit 142 may predict, as the time at which the vehicle 1 arrives at the point of decrease 5, time T10 at which the travel distance of the vehicle 1 coincides with the distance Lc from the vehicle 1 to the point of decrease 5 in the case with such a transition of the speed of the vehicle 1. Therefore, the distance calculation unit 142 may make a prediction that the vehicle 1 will travel on the low-μ road R20 frontward of the point of decrease 5 at and after the time T10.

Thereafter, the distance calculation unit 142 may predict the deceleration of the vehicle 1 frontward of the point of decrease 5. In other words, the distance calculation unit 142 may predict the deceleration of the vehicle 1 with respect to the low-μ road R20. The distance calculation unit 142 may apply deceleration $A_1$ corresponding to the friction coefficient of the low-μ road R20 as the road surface frontward of the point of decrease 5, as the predicted value of the deceleration of the vehicle 1 frontward of the point of decrease 5. Specifically, the deceleration $A_1$ corresponds to a value obtained by multiplying the friction coefficient of the low-μ road R20 by gravitational acceleration. Here, the deceleration of the vehicle 1 may be limited to a value corresponding to a friction coefficient of a currently-traveled road surface or less. Therefore, on travel on the low-μ road R20, the deceleration of the vehicle 1 may be limited to a value whose absolute value is relatively low. It is to be noted that one cause of such limitation on the deceleration is that a maximum value of a frictional force to be generated between a wheel and a road surface becomes a value corresponding to multiplication of a friction coefficient of the road surface and weight of a vehicle body. For example, as illustrated in FIG. 5A, the distance calculation unit 142 may make a prediction that the deceleration of the vehicle 1 will be limited to the deceleration $A_1$ at and after the time T10 in a case where an absolute value of the current deceleration $A_0$ of the vehicle 1 is larger than an absolute value of the deceleration $A_1$. Thus, applying the deceleration $A_1$ corresponding to the friction coefficient of the road surface frontward of the point of decrease 5, as the predicted value of the deceleration of the vehicle 1 frontward of the point of decrease 5, makes it possible to appropriately predict the transition of the deceleration of the vehicle 1.

Thereafter, the distance calculation unit 142 may predict the predicted braking distance Lp. For example, as illustrated in FIG. 5B, the distance calculation unit 142 may make a prediction that the speed of the vehicle 1 will decrease at the time change rate corresponding to the deceleration $A_1$ at and after the time T10. Therefore, the distance calculation unit 142 may predict, as the predicted braking distance Lp, the travel distance of the vehicle 1 at time at which the speed of the vehicle 1 becomes zero (0) in the case with such a transition of the speed of the vehicle 1.

The collision prediction unit 144 may predict, on the basis of a comparison result of the distance from the vehicle 1 to the frontward obstacle with the predicted braking distance Lp, whether or not the vehicle 1 will collide with the obstacle. Moreover, the collision prediction unit 144 may output a prediction result to the controller 160. In one specific but non-limiting example, in a case where the predicted braking distance Lp is equal to or longer than the distance from the vehicle 1 to the frontward obstacle, the collision prediction unit 144 may make a prediction that the vehicle 1 will collide with the obstacle. In a case where the predicted braking distance Lp is shorter than the distance from the vehicle 1 to the frontward obstacle, the collision prediction unit 144 may make a prediction that the vehicle 1 will not collide with the obstacle.

Figure 6A:
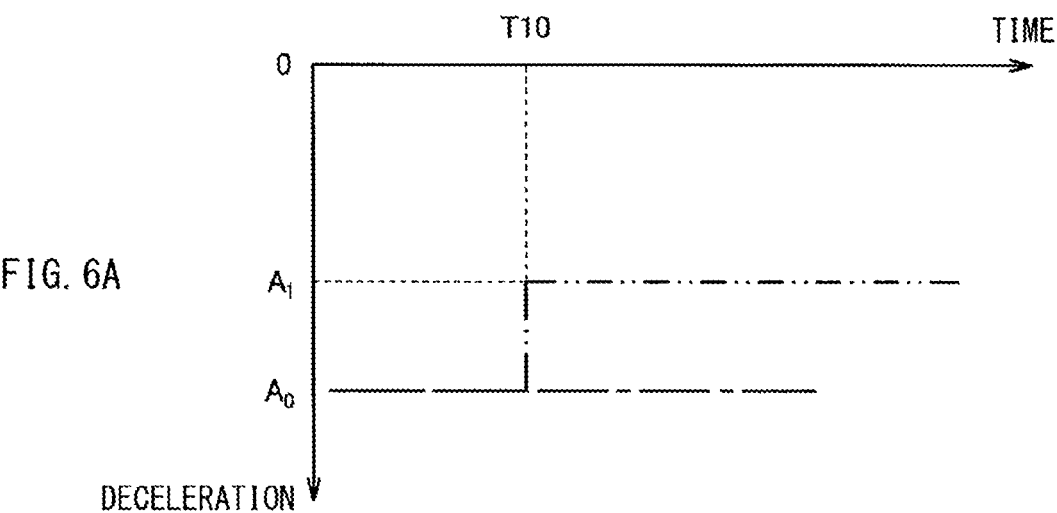
FIG. 6A illustrates the driver's intended transition of the deceleration illustrated in FIG. 4A, as superimposed on the transition of the predicted value of the deceleration illustrated in FIG. 5A.
Figure 6B:
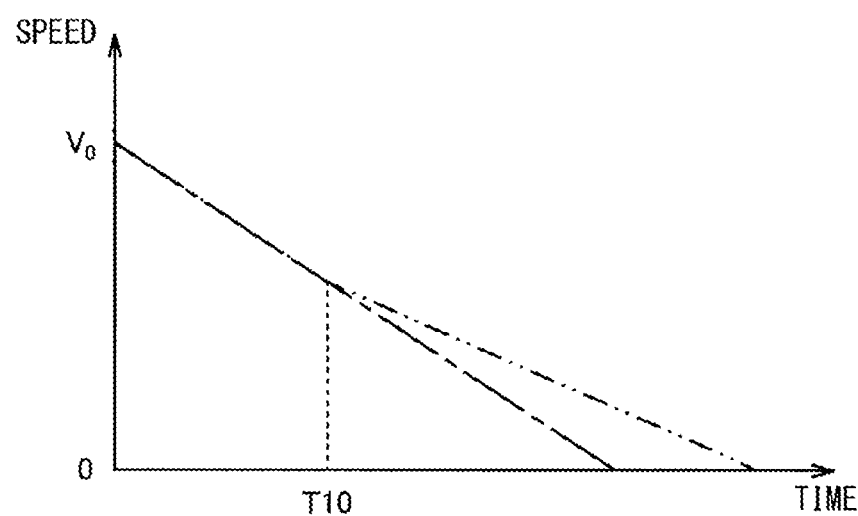
FIG. 6B illustrates the driver's intended transition of the speed illustrated in FIG. 4B, as superimposed on the transition of the predicted value of the speed illustrated in FIG. 5B.
Figure 6C:
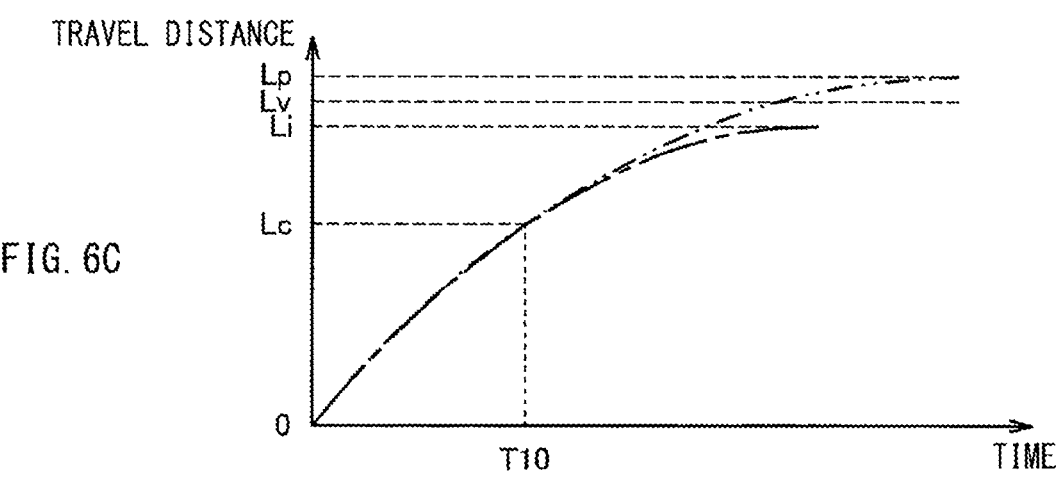
FIG. 6C illustrates the driver's intended transition of the travel distance illustrated in FIG. 4C, as superimposed on the transition of the predicted value of the travel distance illustrated in FIG. 5C.

FIGS. 6A, 6B, and 6C illustrate the driver's intended transitions of the various state quantities illustrated in FIGS. 4A, 4B, and 4C, as superimposed on the transitions of the predicted values of the various state quantities illustrated in FIGS. 5A, 5B, and 5C. Specifically, in FIGS. 6A, 6B, and 6C, the driver's intended transitions of the various state quantities illustrated in FIGS. 4A, 4B, and 4C are denoted by dash-single dot lines, while the transitions of the predicted values of the various state quantities illustrated in FIGS. 5A, 5B, and 5C are denoted by dash-double dot lines.

For example, the collision prediction unit 144 may predict whether or not the vehicle 1 will collide with the stopped vehicle 9 on the basis of a comparison result of the distance Lv from the vehicle 1 to the stopped vehicle 9 with the predicted braking distance Lp. As illustrated in FIG. 5C, the collision prediction unit 144 may make a prediction that the vehicle 1 will collide with the stopped vehicle 9, in a case where the predicted braking distance Lp is equal to or longer than the distance Lv from the vehicle 1 to the stopped vehicle 9.

As illustrated in FIG. 6A, at and after the time T10, the driver's intended deceleration of the vehicle 1 is the deceleration $A_0$, while the predicted value of the deceleration of the vehicle 1 is the deceleration $A_1$ whose absolute value is smaller than that of the deceleration $A_0$. Accordingly, as illustrated in FIG. 6B, at and after the time T10, the time change rate of the predicted value of the speed of the vehicle 1 becomes smaller than the time change rate of the driver's intended speed of the vehicle 1. Therefore, as illustrated in FIG. 6C, the predicted braking distance Lp becomes longer than the driver's intended braking distance Li. Thus, as illustrated in FIG. 6C, even in a case where the driver's intended braking distance Li is shorter than the distance Lv from the vehicle 1 to the stopped vehicle 9, the predicted braking distance Lp may possibly become equal to or longer than the distance Lv. At this occasion, if the brake power control were not executed, the actual braking distance would become longer than the driver's intended braking distance Li, causing the vehicle 1 to collide with the stopped vehicle 9 frontward.

As described, the distance calculation unit 142 may calculate the predicted braking distance Lp on the basis of the change information. That way, in the case with the presence of the point of decrease 5 in the friction coefficient frontward of the vehicle 1, it is possible to appropriately predict the braking distance when the brake power control is not executed. Moreover, the collision prediction unit 144 may predict, on the basis of the comparison result of the distance from the vehicle 1 to the frontward obstacle with the predicted braking distance Lp, whether or not the vehicle 1 will collide with the obstacle. Hence, in the case with the presence of the point of decrease 5 in the friction coefficient frontward of the vehicle 1, it is possible to predict with high precision whether or not the vehicle 1 will collide with the frontward obstacle.

[Controller]

The controller 160 controls the brake power of the vehicle 1. In one specific but non-limiting example, the controller 160 controls the brake power of the vehicle 1 on the basis of the change information, in the case where the prediction is made that the vehicle 1 will collide with the obstacle. For example, in the case where the prediction is made that the vehicle 1 will collide with the obstacle, the controller 160 may output an operational instruction to the hydraulic pressure supply unit 25 on the basis of the change information, to execute the brake power control based on the change information. In the case where no prediction is made that the vehicle 1 will collide with the obstacle, the controller 160 does not have to execute the brake power control based on the change information. In this case, the hydraulic pressure supply unit 25 may operate in accordance with the operation force of the brake pedal 21 by the driver. This causes the hydraulic pressure in accordance with the operation force to be supplied to the brake devices 13a, 13b, 13c, and 13d, causing the brake power in accordance with the operation force to be imparted to the wheels 11a, 11b, 11c, and 11d.

The controller 160 may include, for example, as illustrated in FIG. 3, a deceleration calculation unit 162 and a brake power control unit 164.

The deceleration calculation unit 162 may calculate target deceleration, on the basis of the change information. The target deceleration may be target values of deceleration frontward and rearward of the point of decrease 5. Moreover, the deceleration calculation unit 162 may output, to the brake power control unit 164, information indicating the target deceleration frontward and rearward of the point of decrease 5 thus calculated. For example, execution of calculation processing of the target deceleration by the deceleration calculation unit 162 may be triggered by the prediction being made that the vehicle 1 will collide with the obstacle. In one specific but non-limiting example, the deceleration calculation unit 162 may calculate the target deceleration frontward and rearward of the point of decrease 5, to bring a target braking distance to a value decided on the basis of the driver's intended braking distance Li, e.g., a value relatively close to the driver's intended braking distance Li. The target braking distance may be a target value of the braking distance of the vehicle 1.

Figure 7A:
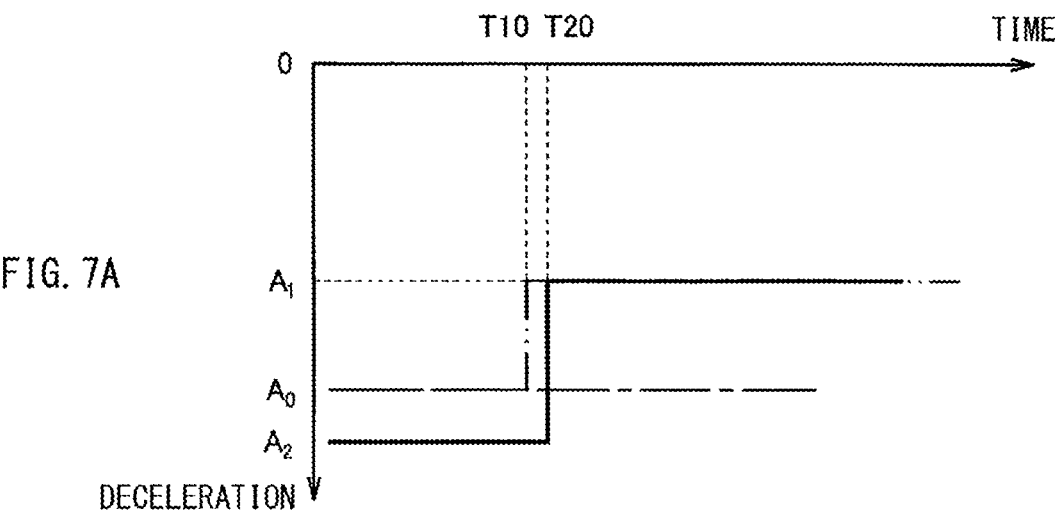
FIG. 7A schematically illustrates one example of transition of a target value of the deceleration in a brake power control according to the implementation.
Figure 7B:
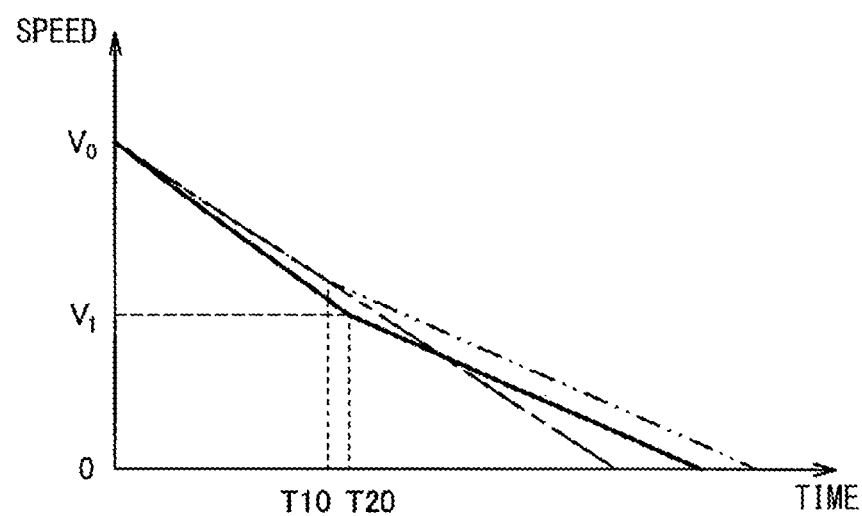
FIG. 7B schematically illustrates one example of transition of a target value of the speed in the brake power control according to the implementation.
Figure 7C:
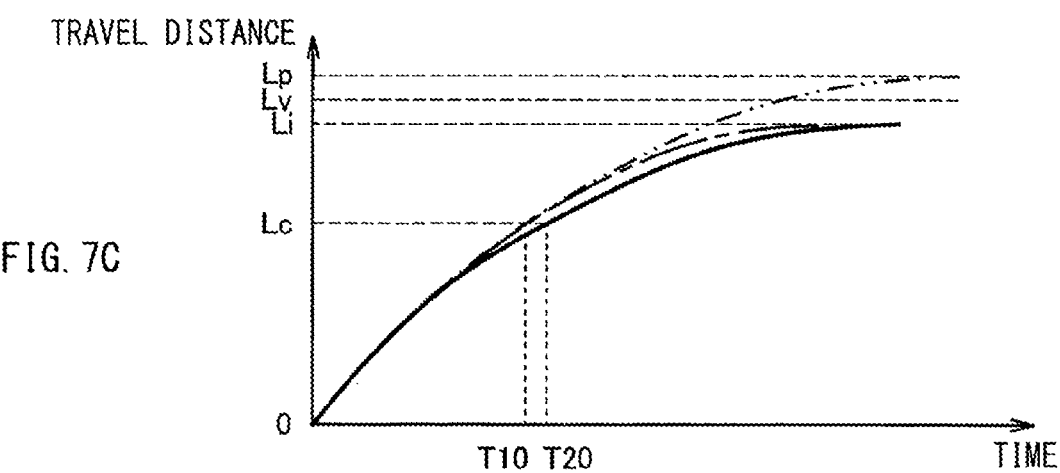
FIG. 7C schematically illustrates one example of transition of a target value of the travel distance in the brake power control according to the implementation.

FIGS. 7A, 7B, and 7C schematically illustrate one example of transitions of target values of the various state quantities in the brake power control according to this implementation. Specifically, in FIGS. 7A, 7B, and 7C, the transitions of the target values of the various state quantities are denoted by solid lines. FIGS. 7A, 7B, and 7C illustrate, as the various state quantities, the deceleration of the vehicle 1, the speed of the vehicle 1, and the travel distance of the vehicle 1, as with FIGS. 4A, 4B, and 4C. It is to be noted that in FIGS. 7A, 7B, and 7C, the driver's intended transitions of the various state quantities illustrated in FIGS. 4A, 4B, and 4C are denoted by dash-single dot lines, while the transitions of the predicted values of the various state quantities illustrated in FIGS. 5A, 5B, and 5C are denoted by dash-double dot lines. Moreover, FIGS. 7A, 7B, and 7C illustrate one example of the transitions of the target values of the various state quantities after the brake operation has been performed.

In one specific but non-limiting example, the deceleration calculation unit 162 may calculate the target deceleration frontward and rearward of the point of decrease 5, on the basis of the current speed $V_0$ of the vehicle 1, the distance Lc from the vehicle 1 to the point of decrease 5, the distance Lv from the vehicle 1 to the stopped vehicle 9, and the friction coefficient of the low-μ road R20 frontward of the point of decrease 5.

For example, the deceleration calculation unit 162 may, first, calculate the target deceleration frontward of the point of decrease 5. In other words, the deceleration calculation unit 162 may, first, calculate the target deceleration with respect to the low-μ road R20. The deceleration calculation unit 162 may calculate the deceleration $A_1$ corresponding to the friction coefficient of the low-μ road R20 as the road surface frontward of the point of decrease 5, as the target deceleration frontward of the point of decrease 5. As described, the deceleration $A_1$ corresponds specifically to the value obtained by multiplying the friction coefficient of the low-μ road R20 by the gravitational acceleration. Moreover, the deceleration $A_1$ corresponds to a maximum value of the deceleration of the vehicle 1 that may be possibly generated on the low-μ road R20. Calculating the deceleration $A_1$ as mentioned above as the target deceleration frontward of the point of decrease 5 makes it possible to suppress deviation between the target deceleration rearward of the point of decrease 5 and the driver's intended deceleration. Hence, it is possible to effectively suppress the driver from feeling strange.

Thereafter, the deceleration calculation unit 162 may calculate the target value of the speed of the vehicle 1 at time T20 at which the vehicle 1 arrives at the point of decrease 5. In one specific but non-limiting example, the deceleration calculation unit 162 may decide the target braking distance, i.e., the target value of the braking distance, on the basis of the driver's intended braking distance Li. In one more specific but non-limiting example, the deceleration calculation unit 162 may decide the target braking distance to be the driver's intended braking distance Li. Moreover, the deceleration calculation unit 162 may calculate a speed $V_1$, as a target value of the speed of the vehicle 1 at the time T20. The speed $V_1$ may be a speed that brings the target value of the speed to zero (0) at time at which the vehicle 1 advances from the current position by the target braking distance, in a case where the target speed decreases at the time change rate corresponding to the deceleration $A_1$ at and after the time T20. For example, the deceleration calculation unit 162 may calculate the speed $V_1$, on the basis of a value obtained by subtracting the distance Lc from the vehicle 1 to the point of decrease 5 from the target braking distance, and on the basis of the deceleration $A_1$, i.e., the target deceleration frontward of the point of decrease 5.

Thereafter, the deceleration calculation unit 162 may calculate the target deceleration rearward of the point of decrease 5. In other words, the deceleration calculation unit 162 may calculate the target deceleration with respect to the high-μ road R10. In one specific but non-limiting example, the deceleration calculation unit 162 may calculate deceleration $A_2$, as the target deceleration rearward of the point of decrease 5. The deceleration $A_2$ may be deceleration that brings the target value of the speed to the speed $V_1$ at the time T20 at which the vehicle 1 arrives at the point of decrease 5. For example, the deceleration calculation unit 162 may calculate the deceleration $A_2$ on the basis of the current speed $V_0$ of the vehicle 1, the distance Lc from the vehicle 1 to the point of decrease 5, and the speed $V_1$. The speed $V_1$ may be the target value of the speed of the vehicle 1 at the time T20.

Here, specifically, as described above, the target braking distance may be decided to be the driver's intended braking distance Li. Therefore, in the case where the prediction is made that the vehicle 1 will collide with the stopped vehicle 9, the target braking distance may be shorter than the predicted braking distance Lp. Moreover, on travel on the low-μ road R20, the deceleration of the vehicle 1 may be limited to the value whose absolute value is relatively small. In one specific but non-limiting example, the target deceleration frontward of the point of decrease 5 may take a value equal to or smaller than the deceleration $A_1$, as with the predicted value of the deceleration. Accordingly, the speed $V_1$, i.e., the target value of the speed of the vehicle 1 at the time T20 at which the vehicle 1 arrives at the point of decrease 5, is lower than the speed of the vehicle 1 at the time T10 at which the vehicle 1 arrives at the point of decrease 5 in the case where the brake control is not executed. Thus, an absolute value of the deceleration $A_2$ calculated as the target deceleration rearward of the point of decrease 5 is larger than the absolute value of the current deceleration $A_0$ of the vehicle 1.

As described, in one specific but non-limiting example, the deceleration calculation unit 162 may calculate, as the target deceleration rearward of the point of decrease 5, the deceleration $A_2$ whose absolute value is larger than that of the current deceleration $A_0$ of the vehicle 1. This allows for appropriate calculation of the target deceleration frontward and rearward of the point of decrease 5, to bring the target braking distance to the value decided on the basis of the driver's intended braking distance Li, in the case where the prediction is made that the vehicle 1 will collide with the stopped vehicle 9.

The brake power control unit 164 may control the brake power of the vehicle 1, to bring the deceleration of the vehicle 1 to the target deceleration. In one specific but non-limiting example, the brake power control unit 164 may output an operational instruction to the hydraulic pressure supply unit 25 on the basis of the target deceleration frontward and rearward of the point of decrease 5, to control the brake power of the vehicle 1. For example, the brake power control unit 164 may output, to the hydraulic pressure supply unit 25, an operational instruction value corresponding to a difference between a value of the deceleration of the vehicle 1 detected by the deceleration sensor 203 and the target deceleration. Thus, the brake power of the vehicle 1 may be controlled, to bring the deceleration of the vehicle 1 to the target deceleration.

As described, the deceleration calculation unit 162 may calculate, on the basis of the change information, the target deceleration, i.e., the target values of the deceleration frontward and rearward of the point of decrease 5. This makes it possible to appropriately calculate the target deceleration frontward and rearward of the point of decrease 5, to bring the target braking distance to the value decided on the basis of the driver's intended braking distance Li, in the case with the presence of the point of decrease 5 in the friction coefficient frontward of the vehicle 1. Moreover, the brake power control unit 164 may control the brake power of the vehicle 1, to bring the deceleration of the vehicle 1 to the target deceleration. This makes it possible, with high accuracy, to allow the actual braking distance to coincide with the value decided on the basis of the driver's intended braking distance Li, even in the case with the presence of the point of decrease 5 in the friction coefficient frontward of the vehicle 1. As described, in one specific but non-limiting example, the controller 160 may control the brake power of the vehicle 1, to bring the braking distance of the vehicle 1 to the value decided on the basis of the driver's intended braking distance Li, in the case where the prediction is made that the vehicle 1 will collide with the frontward obstacle.

As described, in this implementation, the predictor 140 predicts, on the basis of the change information, whether or not the vehicle 1 will collide with the frontward obstacle, in the case where the brake operation by the driver has been performed. The change information is information regarding the change in the friction coefficient of the road surface frontward of the vehicle 1. Hence, it is possible to appropriately predict whether or not the vehicle 1 will collide with the frontward obstacle, in the case with the presence of the point of decrease 5 in the friction coefficient frontward of the vehicle 1. Moreover, the controller 160 controls the brake power of the vehicle 1 on the basis of the change information in the case where the prediction is made that the vehicle 1 will collide with the obstacle. This makes it possible to allow the actual braking distance to coincide with the value decided on the basis of the driver's intended braking distance Li, even in the case with the presence of the point of decrease 5 in the friction coefficient frontward of the vehicle 1. It is, therefore, possible to prevent the vehicle 1 from colliding with the frontward obstacle, while bringing the behavior of the vehicle 1 close to the driver's intended behavior, in the case where the brake operation by the driver has been performed. Hence, it is possible to enhance safety while suppressing the driver from feeling strange.

[2-2. Operation]

Figure 8:
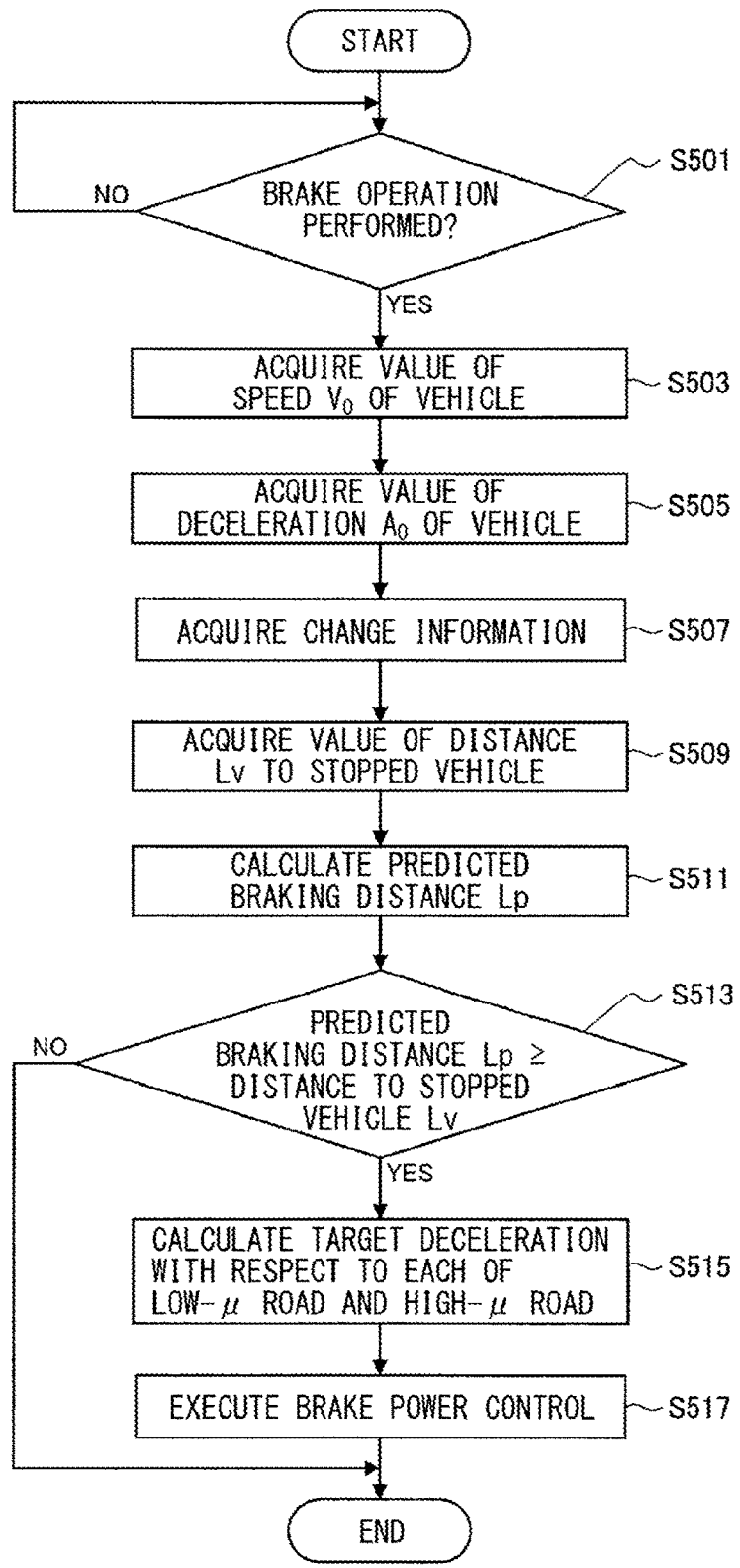
FIG. 8 is a flowchart that illustrates one example of a flow of processing to be performed by the control device according to the implementation.

Next, with reference to FIG. 8, described is a flow of processing to be performed by the control device 100 according to this implementation. FIG. 8 is a flowchart of one example of the flow of the processing to be performed by the control device 100 according to this implementation.

As illustrated in FIG. 8, first, the control device 100 may determine whether or not the brake operation has been performed (step S501). In a case where no determination is made that the brake operation has been performed (No in step S501), the determination process in step S501 may be repeated. In a case where a determination is made that the brake operation has been performed (YES in step S501), the acquirer 120 may acquire the value of the current speed $V_0$ of the vehicle 1 (step S503), and output the value acquired, to the predictor 140 and the controller 160. Thereafter, the acquirer 120 may acquire the value of the current deceleration $A_0$ of the vehicle 1 (step S505), and output the value acquired, to the predictor 140 and the controller 160. Thereafter, the acquirer 120 may acquire the change information, i.e., the information regarding the change in the friction coefficient of the road surface frontward of the vehicle 1 (step S507), and output the information acquired, to the predictor 140 and the controller 160. Thereafter, the acquirer 120 may acquire the value of the distance Lv from the vehicle 1 to the stopped vehicle 9 (step S509), and output the value acquired, to the predictor 140 and the controller 160.

Thereafter, the distance calculation unit 142 may calculate, on the basis of the change information, the predicted braking distance Lp (step S511). The predicted braking distance Lp may be the predicted value of the braking distance of the vehicle 1. The distance calculation unit 142 may output information indicating the predicted braking distance Lp thus calculated, to the collision prediction unit 144. Thereafter, the collision prediction unit 144 may predict whether or not the vehicle 1 will collide with the stopped vehicle 9, by determining whether or not the predicted braking distance Lp is equal to or longer than the distance Lv from the vehicle 1 to the stopped vehicle 9 (step S513). In a case where the predicted braking distance Lp is shorter than the distance Lv from the vehicle 1 to the stopped vehicle 9 (NO in step S513), the collision prediction unit 144 may make a prediction that the vehicle 1 will not collide with the stopped vehicle 9. Thus, the processing illustrated in FIG. 8 may be terminated.

In a case where the predicted braking distance Lp is equal to or longer than the distance Lv from the vehicle 1 to the stopped vehicle 9 (YES in step S513), the collision prediction unit 144 may make the prediction that the vehicle 1 will collide with the stopped vehicle 9. In this case, the deceleration calculation unit 162 may calculate, on the basis of the change information, the target deceleration with respect to each of the low-μ road R20 and the high-μ road R10 (step S515). The deceleration calculation unit 162 may output, to the brake power control unit 164, information indicating the target deceleration thus calculated with respect to each of the low-μ road R20 and the high-μ road R10. Thereafter, the brake power control unit 164 may execute the brake power control, to bring the deceleration of the vehicle 1 to the target deceleration (step S517). Thus, the processing illustrated in FIG. 8 may be terminated.

3. Conclusion

As described, in this implementation, in the case where the brake operation by the driver has been performed, the prediction is made as to whether or not the vehicle 1 will collide with the frontward obstacle, on the basis of the change information, i.e., the information regarding the change in the friction coefficient of the road surface frontward of the vehicle 1. Accordingly, it is possible to appropriately predict whether or not the vehicle 1 will collide with the frontward obstacle, in the case with the presence of the point of decrease 5 in the friction coefficient frontward of the vehicle 1. Moreover, in this implementation, in the case where the prediction is made that the vehicle 1 will collide with the obstacle, the brake power of the vehicle 1 is controlled on the basis of the change information. Accordingly, it is possible to allow the actual braking distance to coincide with the value decided on the basis of the driver's intended braking distance Li, even in the case with the presence of the point of decrease 5 in the friction coefficient frontward of the vehicle 1. It is therefore possible to prevent the vehicle 1 from colliding with the frontward obstacle, while bringing the behavior of the vehicle 1 close to the driver's intended behavior, in the case where the brake operation by the driver has been performed. Hence, it is possible to enhance safety while suppressing the driver from feeling strange.

Moreover, in the forgoing, described is an example in which the brake device provided in the vehicle 1 may be a so-called disk brake. However, the kind of the brake device is not limited to as exemplified above, insofar as the brake device is able to generate the brake power of the vehicle 1. For example, the brake device provided in the vehicle 1 may be a so-called drum brake. Moreover, in a case where the vehicle 1 is an electric vehicle (EV) or a hybrid vehicle (HEV) including a drive motor, the drive motor that is able to generate the brake power of the vehicle 1 by regenerative power generation may serve as the brake device as mentioned above. It is to be noted that there is no particular limitation on a driving source that drives the wheels 11a, 11b, 11c, and 11d.

Furthermore, in the forgoing, described is an example in which the hydraulic pressure to be supplied to the brake devices 13a, 13b, 13c, and 13d may be separately adjustable. However, it is not necessary for the hydraulic pressure to be supplied to the brake devices 13a, 13b, 13c, and 13d to be separately adjustable. For example, the brake system may include two systems. In this case, for example, the hydraulic pressure to be supplied to the brake devices 13a and 13d may be separately adjustable from the hydraulic pressure to be supplied to the brake devices 13b and 13c. Alternatively, the hydraulic pressure to be supplied to the brake devices 13a and 13b may be separately adjustable from the hydraulic pressure to be supplied to the brake devices 13c and 13d.

In addition, in the forgoing, described mainly is an example in which the obstacle frontward of the vehicle 1 may be the stopped vehicle 9. However, the obstacle is not limited to as exemplified above. Specifically, the obstacle may be any object located frontward of the vehicle 1 that hinders the vehicle 1 from advancing. The obstacle may be other object than the stopped vehicle 9.

Moreover, the processing as described herein with the use of the flowchart is not necessarily executed in the order illustrated in the flowchart. Some processes of steps may be executed in parallel. For example, in the flowchart illustrated in FIG. 8, processes of steps S503, S505, S507, and S509 are not necessarily executed in the order illustrated in the flowchart, but may be executed in parallel. Furthermore, in the flowchart illustrated in FIG. 8, the determination process of step S501 may be executed after the processes of steps S503, S505, S507, and S509. Moreover, additional processes of steps may be adopted, or alternatively, some processes of steps may be omitted.

In one implementation described above, the predictor 140 and the controller 160 illustrated in FIG. 3 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the predictor 140 and the controller 160. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIG. 3.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A control device for a vehicle, the control device comprising:
   a predictor configured to predict, on a basis of change information, whether or not the vehicle will collide with a frontward obstacle, on a condition that a brake operation by a driver has been performed, the change information including information regarding a change in a friction coefficient of a road surface frontward of the vehicle; and
   a controller configured to, after the brake operation by the driver is performed, control a brake power of the vehicle on the basis of the change information, on a condition that a prediction is made that the vehicle will collide with the obstacle.

2. The control device for the vehicle according to claim 1, wherein the controller controls the brake power of the vehicle, to bring a braking distance of the vehicle to a value decided on a basis of a driver's intended braking distance, on the condition that the prediction is made that the vehicle will collide with the obstacle.

3. The control device for the vehicle according to claim 2, wherein the change information further includes information indicating a distance from the vehicle to a point of decrease, and information indicating the friction coefficient of the road surface frontward of the point of decrease, the point of decrease being a point at which the friction coefficient of the road surface decreases frontward of the vehicle.

4. The control device for the vehicle according to claim 3, wherein the predictor includes:
   a distance calculation unit configured to calculate a predicted braking distance on the basis of the change information, the predicted braking distance being a predicted value of the braking distance of the vehicle; and
   a collision prediction unit configured to predict whether or not the vehicle will collide with the obstacle, on a basis of a comparison result of a distance from the vehicle to the obstacle with the predicted braking distance.

5. The control device for the vehicle according to claim 4, wherein the distance calculation unit applies, as a predicted value of deceleration of the vehicle frontward of the point of decrease, deceleration corresponding to the friction coefficient of the road surface frontward of the point of decrease.

6. The control device for the vehicle according to claim 3, wherein the controller includes:

a deceleration calculation unit configured to calculate target deceleration on the basis of the change information, the target deceleration being target values of deceleration frontward and rearward of the point of decrease; and a brake power control unit configured to control the brake power of the vehicle, to bring the deceleration of the vehicle to the target deceleration.

7. The control device for the vehicle according to claim 6, wherein the deceleration calculation unit calculates, as the target deceleration frontward of the point of decrease, deceleration corresponding to the friction coefficient of the road surface frontward of the point of decrease.

8. The control device for the vehicle according to claim 6, wherein the deceleration calculation unit calculates, as the target deceleration rearward of the point of decrease, deceleration having a larger absolute value than an absolute value of current deceleration of the vehicle.

9. The control device for the vehicle according to claim 1, wherein the change information further includes information indicating a distance from the vehicle to a point of decrease calculated based on a detection result of a distribution of the friction coefficient of the road surface frontward of the vehicle, and information indicating the friction coefficient of the road surface frontward of the point of decrease calculated based on the detection result of the distribution of the friction coefficient of the road surface frontward of the vehicle, the point of decrease being a point at which the friction coefficient of the road surface decreases frontward of the vehicle.

10. The control device for the vehicle according to claim 3, wherein the predictor includes:
    a distance calculation unit configured to calculate a predicted braking distance on the basis of the change information, the predicted braking distance being a predicted value of the braking distance of the vehicle; and
    a collision prediction unit configured to predict whether or not the vehicle will collide with the obstacle, on a basis of a comparison result of a distance from the vehicle to the obstacle with the predicted braking distance.

11. The control device for the vehicle according to claim 10, wherein the distance calculation unit applies, as a predicted value of deceleration of the vehicle frontward of the point of decrease, deceleration corresponding to the friction coefficient of the road surface frontward of the point of decrease.

12. The control device for the vehicle according to claim 9, wherein the controller includes:

a deceleration calculation unit configured to calculate target deceleration on the basis of the change information, the target deceleration being target values of deceleration frontward and rearward of the point of decrease; and a brake power control unit configured to control the brake power of the vehicle, to bring the deceleration of the vehicle to the target deceleration.

13. The control device for the vehicle according to claim 12, wherein the deceleration calculation unit calculates, as the target deceleration frontward of the point of decrease, deceleration corresponding to the friction coefficient of the road surface frontward of the point of decrease.

14. The control device for the vehicle according to claim 12, wherein the deceleration calculation unit calculates, as the target deceleration rearward of the point of decrease, deceleration having a larger absolute value than an absolute value of current deceleration of the vehicle.

15. The control device for the vehicle according to claim 1, wherein the controller controls the brake power of the vehicle only after the brake operation by the driver is performed.

16. The control device for the vehicle according to claim 1, wherein the obstacle is stationary.

17. The control device for the vehicle according to claim 1, wherein the road surface frontward of the vehicle includes a road that extends from the vehicle to the obstacle.

18. A control device for a vehicle, the control device comprising:
    a circuitry configured to:
        predict, on a basis of change information, whether or not the vehicle will collide with a frontward obstacle, on a condition that a brake operation by a driver has been performed, the change information including information regarding a change in a friction coefficient of a road surface frontward of the vehicle; and
        control brake power of the vehicle, after the brake operation by the driver is performed, on the basis of the change information, on a condition that a prediction is made that the vehicle will collide with the obstacle.

19. The control device for the vehicle according to claim 18, wherein the circuitry controls the brake power of the vehicle only after the brake operation by the driver is performed.

20. The control device for the vehicle according to claim 18, wherein the road surface frontward of the vehicle includes a road that extends from the vehicle to the obstacle.

* * * * *